Jan. 18, 1966 T. G. LEKSELL 3,229,349
CUTTING BIT FOR A MILLING CUTTER
Filed April 24, 1964 3 Sheets-Sheet 1
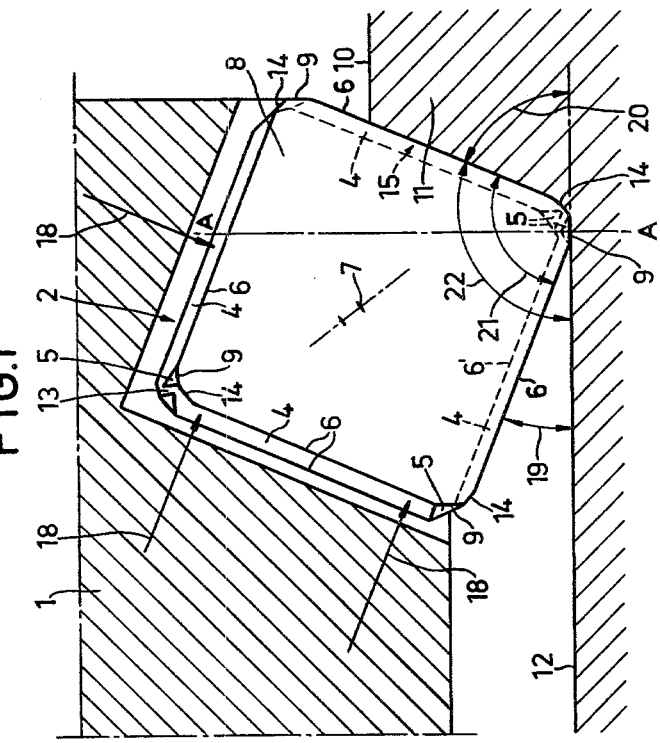
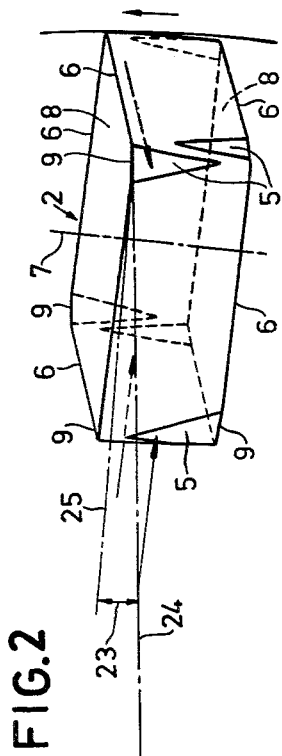
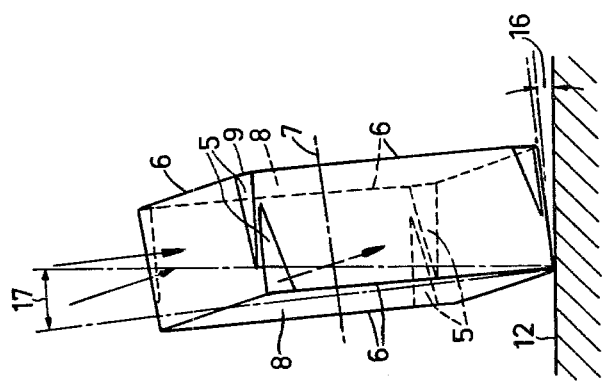
Inventor
Torsten G. Leksell
by Sommers & Young
Attorneys Jan. 18, 1966     T. G. LEKSELL     3,229,349
CUTTING BIT FOR A MILLING CUTTER
Filed April 24, 1964     3 Sheets-Sheet 2
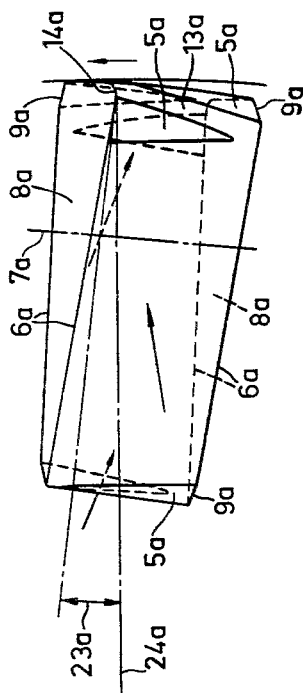
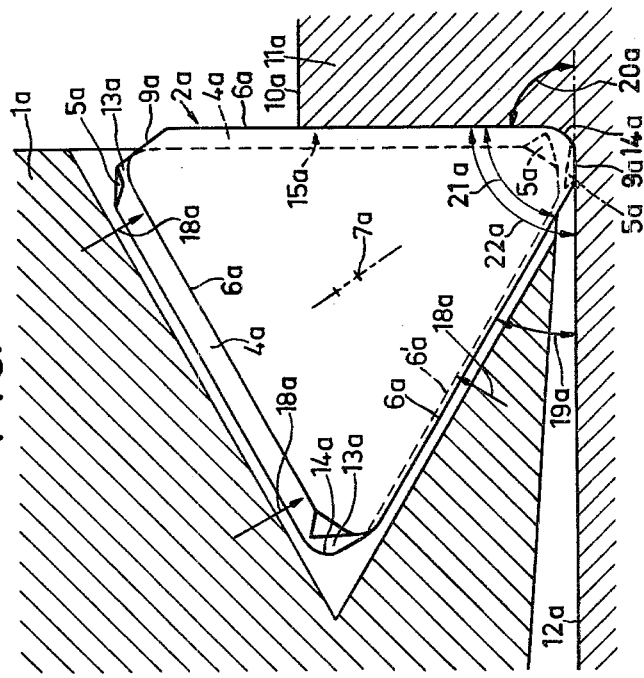
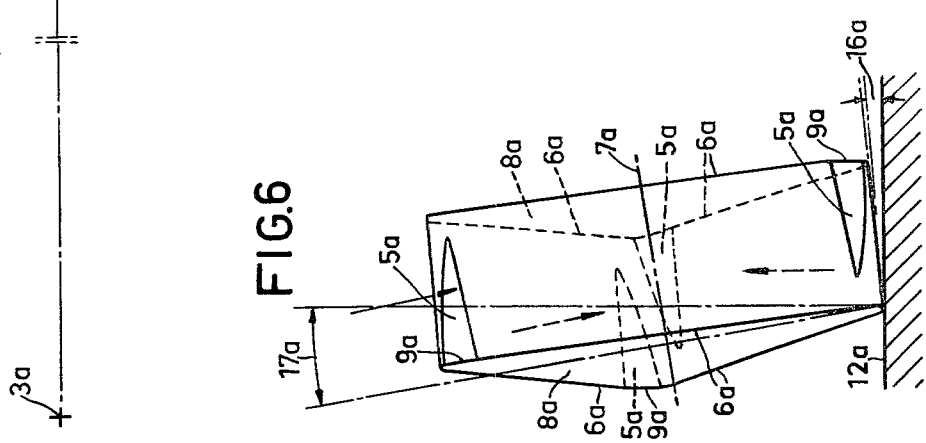
Inventor
Torsten G. Leksell
by Sommers & Young
Attorneys

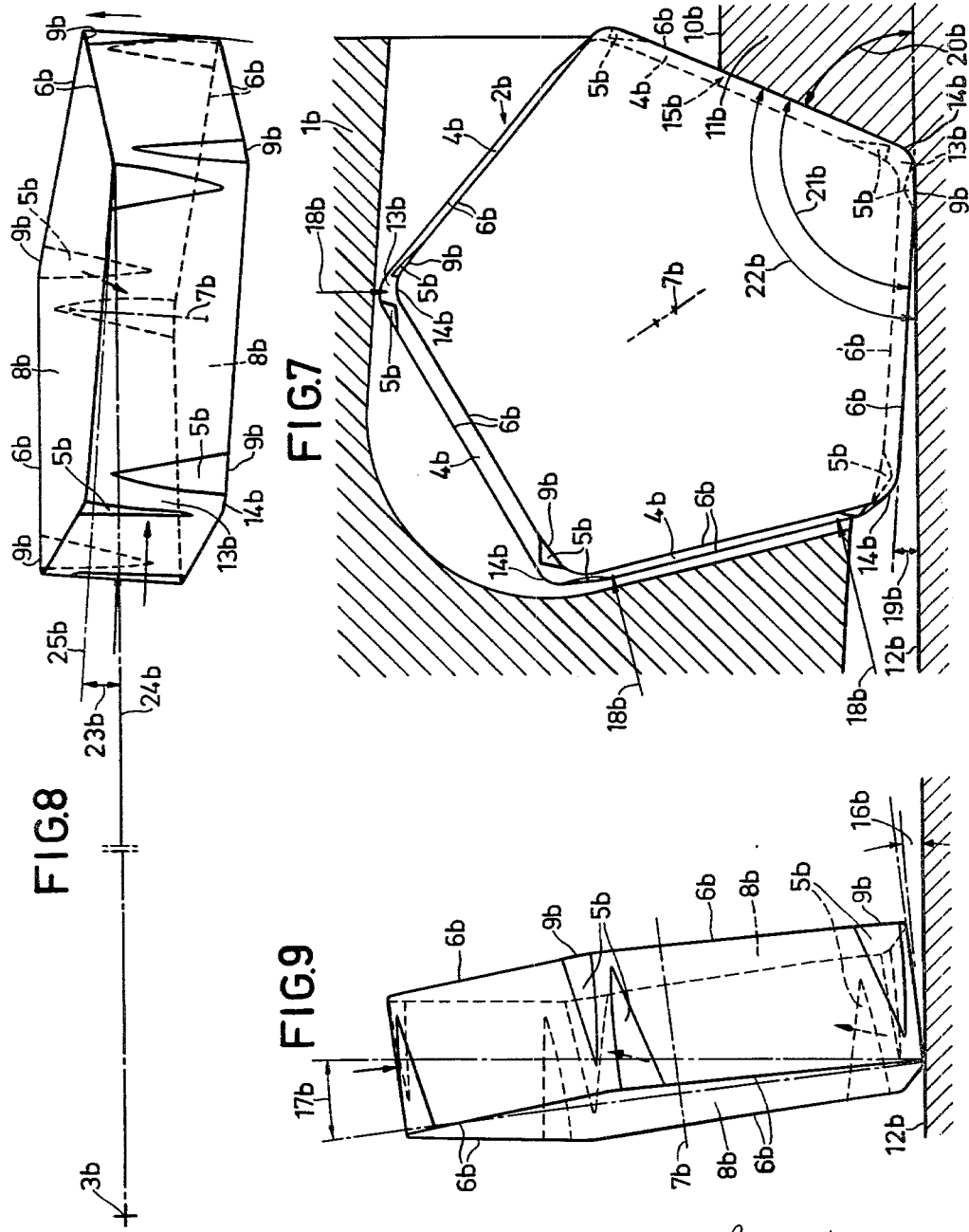

United States Patent Office 3,229,349
Patented Jan. 18, 1966

3,229,349
CUTTING BIT FOR A MILLING CUTTER
Torsten Gunnar Leksell, Fagersta, Sweden, assignor to Fagersta Bruks Aktiebolag, a Swedish joint-stock company
Filed Apr. 24, 1964, Ser. No. 362,342
Claims priority, application Sweden, Apr. 6, 1960, 3,432/60
5 Claims. (Cl. 29—95)

This application is a continuation-in-part of my application Serial No. 100,643.

The present invention relates to a cutting bit for a milling cutter having supports for holding the cutting bit in different cutting positions, said cutting bit having parallel top and bottom base surfaces and side surfaces perpendicular to said top and bottom base surfaces, each side surface forming with each base surface a primary cutting edge, said primary cutting edges being held one at a time in angular relationship to the work surface of the workpiece, said cutting bit further having plain beveled surfaces or facets located at the junctions between its side surfaces, there being one of said beveled facets for each primary cutting edge of the cutting bit, said beveled surfaces being oblique not only in relation to the side surfaces of the bit but also in relation to that axis of the cutting bit which is perpendicular to the top and bottom base surfaces and passes the center of the cutting bit, each of said beveled surfaces or facets forming with an adjacent base surface a secondary cutting edge which in its working position extends from the adjacent primary cutting edge in parallel with the work surface of the workpiece, each of said beveled surfaces forming such a secondary cutting edge with only one of said two base surfaces of the cutting bit.

When using such cutting bits of conventional design, e.g., cutting bits without facets of the kind described, it was always necessary to make the choice of the clearance angle a compromise between two contrasting desires. A smooth surface finish of the workpiece, on the one hand, calls for a small clearance angle, but a small clearance angle, on the other hand, results in the wear of an edge which during the continued application of the cutter is supposed to serve as a cutting edge. The present invention removes the said detrimental conflict of desires.

The fact that each of the beveled surfaces or facets forms a secondary cutting edge with only one of the two base surfaces of the cutting bit is dependent on the one hand, on its oblique relationship to said axis of the cutting bit and, on the other hand, on to its size. The fact that the beveled surfaces form a secondary cutting edge with only one of the two base surfaces of the cutting bit provides a long unbroken opposite primary cutting edge at the opposed base surface.

When the cutting bit according to the invention is being used, the different cutting edges of the cutting bit are brought into their respective working positions by turning the cutting bit around the above mentioned axis until the cutting edges of one of the base surfaces have been used up, whereupon the cutting bit is turned upside down for bringing one pair of adjacent primary and secondary cutting edges of the other base surface of the cutting bit into working position, whereupon the cutting bit can be turned again around the same axis for bringing other unused edges of said other base surface into working position.

When said plain beveled surfaces of the cutting bit are being ground, the cutting bit may be held in a grinding fixture in exactly the same way (except for the axial rake angle, see below) as it is held in the milling cutter in working. Preferably, it is in this respect supported at two points at one side surface of the cutting bit and at one point at an adjacent side surface of the cutting bit. Naturally, it is also, as is known per se, supported at its top and bottom base surfaces by a conventional clamping mechanism.

Due to the possibility of grinding the cutting bit in a tool, which holds the cutting bit in exactly the same way as it is held in working, there are no troubles with angle imperfections as in other cutting bits having a secondary cutting edge. Compare in this respect for example the cutting bits described in the U.S. Patent 2,930,111.

By placing the cutting bit with different axial rake angles in the grinding tool and in the milling cutter, respectively, one may choose any suitable clearance angle for the secondary cutting edge, the clearance angle of the primary cutting edge being determined by the axial rake angle of the cutting bit in the milling cutter. According to the invention the axial rake angle may be defined as the angle between the surface of the workpiece being machined and the projection of a normal to the parallel top and bottom base surfaces of the cutting bit in a plane parallel to the working direction of the cutting bit and perpendicular to the machined surface of the workpiece, for example, the inclination of the bit in said plane.

Preferably, the corners between the side surfaces of the cutting bit are rounded forming a rounded transition between the edges of each of the pairs of cooperating adjacent primary and secondary cutting edges.

In a preferred embodiment of the invention the top and bottom base surfaces are square-formed. They may, however, also be triangular or pentagonal.

The cutting bit is made of hard metal cutting material, such as high-speed tool steel, cemented carbide, ceramic material or the like.

In addition to the aforesaid advantages the invention provides the possibility of selecting the clearance angles for simultaneously working primary and secondary edges independent of each other. The invention provides also a freedom in setting the axial rake angle.

When grinding a cutting bit having conventional rounded edges between its side surfaces, the center of the bit is calculated on the basis of two side surfaces (which are not opposite one another), whereafter the radius of curvature is determined in relation to the center thus obtained. In practice, the total deviation obtained hereby with highest measuring accuracy for cutting bits of usual size is at least 50 microns.

When grinding an oblique beveled surface of the cutting bit according to the invention, the beveled surface is fixed directly in relation to two side surfaces, which results in a corresponding gain in accuracy. Moreover, a beveled surface which is plain, can be ground with greater accuracy than a rounded one. Finally, the symmetrical conditions render it impossible to make a mistake with respect to the position of the cutting bit when it is being turned or mounted in the milling cutter, since the cutting bit will always be in a position corresponding to the position which it occupied in the grinding fixture. Thanks to these circumstances, the deviation will amount to only 10 microns which represents a considerable gain compared with the deviation of 50 microns caused under the same conditions in the first mentioned case. As a further advantage of the cutting bit according to the invention can be mentioned, that, due to the said small degree of deviation a corresponding gain in surface fineness is rendered obtainable.

The invention will be described in greater detail in the following, reference being had to the accompanying drawings by way of examples some embodiments of the invention. FIGS. 1–3 showing a square cutting bit, FIGS. 4–6 a triangular cutting bit, and FIGS. 7–9 a pentagonal cutting bit.

Referring to FIGS. 1–3, the milling cutter in which the cutting bit is mounted, is designated by 1, the cutting bit by 2, and the rotation center of the milling cutter by 3. In each corner between adjacent side surfaces 4 of the cutting bit two plain beveled surfaces, or facets 5 are formed, there being one of said beveled surfaces 5 for each primary cutting edge 6 of the cutting bit. Said beveled surfaces 5 are oblique not only in relation to the side surfaces 4 but also in relation to that axis 7 of cutting bit which is perpendicular to the top and bottom base surfaces 8 and passes through the center of gravity of the cutting bit. Each of said beveled surfaces 5 forms a secondary cutting edge 9 which in its working position extends from the adjacent primary cutting edge 6 in parallel with the work surface 10 of the workpiece 11 and forms the machined surface 12 of the work piece. Since a beveled surface forms such a secondary cutting edge 9 with only one of said two base surfaces 8 of the cutting bit, the opposite primary cutting edge (6' in FIG. 1) and its adjacent secondary edge of the opposed base surface becomes unbroken. From FIG. 1, for example, it can easily be seen that the secondary cutting edge 9 provides a very smooth machined surface 12. Preferably, the length of the secondary cutting edge 9 is made longer than the feed length per revolution of the milling cutter. As best shown in FIG. 1, the corners 13 between adjacent side surfaces 4 of the cutting bit are rounded, forming a rounded transition 14 between the edges of each pair of cooperating adjacent primary and secondary cutting edges 6 and 9, respectively. These transitions 14 provide a soft cutting, no heat concentration at sharp corners and, thus, a longer tool life. The side surface 4 adjacent a working primary cutting edge 6 forms together with the surface 15 formed by said edge a radial clearance angle, and the plain beveled surface 5 adjacent a working secondary cutting edge 9 forms together with the machined surface 12 of the workpiece 11 an axial clearance angle 16, which is smaller than the axial rake angle 17 of the cutting bit, the axial rake angle 17 (shown in FIG. 3) being defined as the angle between the machined surface of the workpiece and the projection of the axis 7 in a plane parallel to the working direction of the cutting bit and perpendicular to the machined surface of the workpiece (for example the plane A—A of FIG. 1). The cutting bit 2 is, as best shown in FIG. 1, supported in the milling cutter body at three points, namely, at two points at one side surface 4 and at one point at an adjacent side surface 4, the supports being shown only schematically by the arrows 18. Naturally, it is also supported as usual at its top and bottom surfaces 8 by a conventional clamping mechanism (not shown) acting in the direction of the axis 7.

In the drawings, 19 designates the end cutting edge angle and 20 the entering angle of the cutting bit. 21 designates the nose angle of a normal cutting bit and 22 the included nose angle provided by the grinding of the beveled surfaces 5. The (negative) axial rake angle is, as mentioned, designated by 17, whereas the (negative) radial rake angle is designated by 23. The (negative) radial rake angle 23 may also be defined as the (negative) radial inclination of the bit in relation to a plane parallel to the machined surface 12, 24 being a radius of the milling cutter and 25 the intersection line between the paper plane of FIG. 2 and the plane of the upper base surface 8 of the cutter bit in the same figure.

FIGS. 4–6 and 7–9 show a second and a third embodiment of the present invention, respectively, more exactly, a triangular and a pentagonal cutting bit, respectively. However, since these embodiments are not, as a matter of principle, different from the above described embodiment, they need no special description. Instead, details corresponding to details in FIGS. 1–3 have been given the same reference numerals as in said figures, but with an addition of the letter *a* and *b*, respectively.

I claim:

1. A cutting bit for a milling cutter having supports for holding the cutting bit in different cutting positions, said cutting bit having parallel top and bottom base surfaces and side surfaces perpendicular to said top and bottom base surfaces, each side surface forming with each base surface a primary cutting edge, said primary cutting edges being held one at a time in angularly relationship to the work surface of the workpiece, said cutting bit further having plain surfaces located at the junctions between its side surfaces and disposed obliquely with respect to each of their adjacent side surfaces, respectfully, there being one of said obliquely disposed surfaces for each primary cutting edge of the cutting bit, said obliquely disposed surfaces being disposed obliquely not only in relation to the said respective side surfaces of the bit but also in relation to that axis of the cutting bit which is perpendicular to the top and bottom base surfaces and passes through the center of the cutting bit, each of said obliquely disposed surfaces forming a secondary cutting edge which, in its working position, extends from the adjacent primary cutting edge in parallel with the surface of the workpiece being worked, each of said beveled surfaces forming such a secondary cutting edge with only one of said two base surfaces of the cutting bit.

2. A cutting bit for a milling cutter having supports for holding the cutting bit in different cutting positions, said cutting bit having parallel top and bottom base surfaces and side surfaces substantially perpendicular to said top and bottom base surfaces, each side surface forming with each base surface a primary cutting edge, said primary cutting edges being by turning the cutting bit capable of being brought one at a time in cutting position in angular relationship to the work surface of the workpiece, said cutting bit further having plain obliquely disposed surfaces located at the junctions between said side surfaces, there being one of said oblique surfaces for each of said primary cutting edges of the cutting bit, said oblique surfaces being oblique not only in relation to the side surfaces of the bit but also in relation to axes perpendicular to said top and bottom base surfaces of the cutting bit, each of said oblique surfaces forming a secondary cutting edge which in its working position extends from the adjacent primary cutting edge in parallel with the surface of the workpiece being worked, each of said oblique surfaces forming owing to said oblique relationship such a secondary cutting edge with only one of said two base surfaces of the cutting bit, the clearance angle of the secondary cutting edge being choosable independent of the axial and radial rake angles.

3. A cutting bit for a milling cutter having supports for holding the cutting bit in different cutting positions, said cutting bit having parallel top and bottom base surfaces and side surfaces substantially perpendicular to said top and bottom base surfaces, each side surface forming with each base surface a primary cutting edge, said primary cutting edges being holdable one at a time in angular relationship to the work surface of the workpiece, said cutting bit further having plain surfaces located at the junctions between its side surfaces and disposed obliquely to each of their adjacent side surfaces, there being one of said oblique surfaces for each of said primary cutting edges of the cutting bit, said oblique surfaces also being oblique in relation to axes perpendicular to said top and bottom base surfaces of the cutting bit, each of said oblique surfaces forming a secondary cutting edge which in its working position extends from the adjacent primary cutting edge in parallel with the work surface of the workpiece, the corners between said side surfaces of the cutting bit being rounded forming a rounded transition between the edges of each pair of cooperating adjacent primary and secondary cutting edges, providing a soft cutting and eliminating heat concentrations associated with sharp corners.

4. A cutting bit of substantially parallelopipedic shape for a milling cutter having supports for holding the cutting bit in different cutting positions, said cutting bit having parallel substantially square top and bottom base surfaces and four substantially rectangular side surfaces perpendicular to said top and bottom base surfaces, each side surface forming with each base surface a primary cutting edge, said primary cutting edges being holdable one at a time in angular relationship to the work surface of the workpiece, said cutting bit further having eight plain surfaces located at the junctions between its side surfaces and disposed obliquely to *each* of their adjacent side surfaces, said oblique surfaces being oblique also in relation to the axes of said bit which is perpendicular to said top and bottom base surfaces, each of said oblique surfaces forming a secondary cutting edge which in its working position extends from the adjacent primary cutting edge in parallel with the work surface of the workpiece, the corners between said side surfaces being rounded forming a rounded transition between the two simultaneously working primary and secondary cutting edges of each of the eight pairs of cutting edges.

5. A cutting bit for a milling cutter having supports for holding the cutting bit in different cutting positions, said cutting bit having parallel top and bottom base surfaces and side surfaces substantially perpendicular to said top and bottom base surfaces, each side surface forming with each base surface a primary cutting edge, said primary cutting edges being holdable one at a time in angular relationship to the work surface of the workpiece, said cutting bit further having plain surfaces located at the junction between its side surfaces and disposed obliquely to each of the adjacent side surfaces, there being one of said oblique surfaces for each primary cutting edge of the cutting bit, said oblique surfaces being oblique also in relation to the axes of said cutter perpendicular to said top and bottom base surfaces, each of said oblique surfaces forming a secondary cutting edge which in its working position extends from the adjacent primary cutting edge in parallel with the work surface of the workpiece being worked, each of said oblique surfaces forming such a secondary cutting edge with only one of said two base surfaces of the cutting bit, the side surface adjacent a working primary cutting edge forming together with the surface formed by said edge a radial clearance angle, the plain oblique surface adjacent a working secondary cutting edge forming together with the machined surface of the workpiece an axial clearance angle, said axial clearance angle being smaller than the angle between the machined surface of the workpiece and the projection of one of the above mentioned axes in a plane parallel to the working direction of the cutting bit and perpendicular to the machined surface of the workpiece.

No references cited.

WILLIAM W. DYER, JR., *Primary Examiner.*